United States Patent [19]

deFasselle et al.

[11] Patent Number: 4,489,614

[45] Date of Patent: Dec. 25, 1984

[54] FLOWMETER

[76] Inventors: Robert J. deFasselle, Timberidge Trail, Gates Mills, Ohio 44040; Craig R. deFasselle, 38411 Wood Rd., Willoughby, Ohio 44094

[21] Appl. No.: 444,976

[22] Filed: Nov. 29, 1982

Related U.S. Application Data

[63] Continuation-in-part of Ser. No. 208,630, Nov. 20, 1980, Pat. No. 4,361,051.

[51] Int. Cl.³ .............................................. G01F 1/22
[52] U.S. Cl. ................................................. 73/861.54
[58] Field of Search ........................ 73/861.53, 861.54

[56] References Cited

U.S. PATENT DOCUMENTS

| | | | |
|---|---|---|---|
| 1,238,498 | 8/1917 | Dawley | 73/861.54 |
| 2,091,792 | 8/1937 | Nieseman | 73/861.54 |
| 2,558,356 | 6/1951 | Greene | 73/861.54 X |
| 3,253,459 | 5/1966 | Sorenson et al. | 73/861.54 X |
| 3,408,865 | 11/1968 | Chenault | 73/861.54 |

Primary Examiner—Herbert Goldstein
Attorney, Agent, or Firm—Frijouf, Rust & Pyle

[57] ABSTRACT

A flowmeter for measuring the flow rate of a liquid or gaseous media is disclosed. The flowmeter comprises a body portion including an inlet and an outlet. A fluid path extends between the inlet and the outlet. A core tube is disposed vertically within the body portion and a recessed groove is defined by the core tube. The groove extends longitudinally relative to the core tube and a first piston is movably disposed within the core tube and disposed adjacent the groove. A cross sectional area of the fluid path is defined by the groove and the first piston, the cross sectional area of the fluid path being variably dependent upon the longitudinal disposition of the first piston relative to the groove. A cover tube is disposed adjacent the body portion and in fluid communication with the fluid path. A second piston is disposed within the cover tube and is connected to the first piston by a connecting means enabling the first and second pistons to move in unison. A first and a second side of the second piston are immersed in a static fluid enabling controlled damping of the first piston and an indicator cooperating with the second piston indicates the position thereof relative to the cover tube. An embodiment is disclosed for measuring gaseous flow in which the indicator is operative within a range dependent upon the buoyancy of the connecting means immersed in the static fluid.

15 Claims, 66 Drawing Figures

FLOWMETER

CROSS REFERENCE

This application is a continuation-in-part of my previous patent application, Ser. No. 208,630, filed Nov. 20, 1980, now U.S. Pat. No. 4,361,051. All matter set forth in Ser. No. 208,630 is hereby incorporated by reference into the present disclosure.

BACKGROUND OF THE INVENTION

1. Field of the Invention

This invention relates to flowmeters for measuring the flow rate of a liquid or gaseous media. More particularly, the invention relates to flowmeters having a fluid path of variable cross sectional area.

2. Background of the Invention

This invention relates to flowmeters of the type known as variable area flowmeters. This type of flowmeter provides a weighted member movably disposed across an orifice such that the position of the weighted member determines the orifice area. The weighted member provides an essentially constant fluid head against the fluid entering the system so that the displacement of the weighted member is essentially a linear relation with the rate of volumetric flow of the fluid.

The principal advantage of a variable area flowmeter is that, at low cost, it provides a wide range of capacity with low system resistances and is essentially linear. One well known and popular form of variable area flowmeter, often called a rotameter, utilizes a weight moving vertically within a tapered tube, usually transparent, whose area increases upwardly. Among the disadvantages of this system is the inability to see the float and to read the flow when hidden by dark fluids in larger diameters toward the top of the tube. Rotameters are also subject to instability in the transition zone between laminar and turbulent flow and in many cases, viscosity influences the float response within the meter. These factors often limit accurate low end reading of rotameters to 8–12 percent of the total capacity. Certain desirable methods of applying a transducer for readout and control are limited by the geometry of a rotameter and for large flow rates, rotameters are large and costly. Finally, rotameters often experience severe float pulsation, particularly with low density gas media.

Another proven variable area flowmeter is described in my prior U.S. Pat. No. 3,691,834. This invention overcomes many of the disadvantages of the rotameter. The invention disclosed in U.S. Pat. No. 3,691,834 utilizes a snorkel for liquid media. The snorkel device adds cost and requires a built-in minimum meter pressure drop to function. The snorkel, under some circumstances, may introduce an exponential flow factor which particularly limits wide range low capacity meter designs. In addition, the "thru slot" orifice configuration is difficult to construct in widths narrow enough to provide low capacity meters. In actual practice with metal core tubes and floats, full range capacities below about 1.2 gallons per minute for liquids and 7.0 standard cubic feet per minute for gases have been demonstrated impractical within competitive costs. Extreme float pulsation with low density gas media have been observed with the design thus limiting the commercial application of this design.

Particularly with regard to measuring the rate of flow of a gaseous media, problems have been experienced in the low end of the scale range. Many flowmeters have been proposed in an attempt to combine the required characteristics of low pressure loss in the flowmeter system, together with a variable means for damping the pulsation effects within the gaseous media. Additionally, and most importantly, a long felt need has existed for a flowmeter providing an indication of the rate of flow at the low end of the scale range.

The present invention provides a flowmeter for measuring the rate of flow of a gaseous media having an improved rangeability or turn down, and particularly but not exclusively an improved sensitivity with the low end of the indicator scale range. This improved rangeability is accomplished by the provision of a connecting means extracting between a first and a second piston, the second piston being immersed in a static fluid. By varying the density of the connecting means and the density of the static fluid, the rangeability of the flowmeter is improved. Furthermore, an improved rangeability is obtained by virtue of the shape of the connecting means. The shape of the connecting means may be selected to provide a substantially linear scale.

In order to understand the principles involved in the improved flowmeter of the present invention, it will be appreciated by those skilled in the art that the float displacement which indicates a particular rate of flow, occurs when the weight of the float is balanced at that displacement by the pressure of the flowing gaseous media. This pressure is required to establish the particular flow rate across the exposed cross sectional area of the groove. This pressure acting across the area of the first piston is a force in equilibrium with the total weight of the first piston, the second piston and the connecting means. As is common to variable area flowmeters and well known in the art (NOTE: All equations assume compatible units, eliminating conversion constants.), $$Dg = As \cdot \sqrt{Wf} \tag{1}$$

where
  Dg = displacement for a given cross sectional area of the groove
  As = cross sectional area of the gaseous path defined by the groove
  Wf = weight of the float Also, the effective weight Wf of the float assembly disposed in the gaseous or liquid media is, $$Wf = \sqrt{V \cdot \frac{df - dm}{df}} \tag{2}$$

where
  V = the volume of the float
  df = density of the float
  dm = density of the gaseous media.

When the float is totally immersed in a gaseous media, the flow rate of which is to be determined, the effective weight Wf of the float is constant and the flow rate to displacement relationship is essentially the same as with conventional variable area flowmeters. Furthermore, with the majority of gaseous media, the density of the gas is so low that the weight of the float Wf is taken as, $$Wf = \sqrt{V \times df} \quad (3)$$

Referring to the improved flowmeter of the present invention, it will be appreciated by those skilled in the art that the connecting means connecting the first and the second pistons is variably immersed in a liquid of significant density. Therefore, relative to equations 1 and 2 explained heretofore, $$Dg \, \alpha \, As \times \sqrt{Vg \times df + Vi \times \frac{df - dd}{df}} \quad (4)$$

where
- Vg = volume of float in gaseous media that is the nonbuoyant portion of the first and second pistons and the connecting means.
- Vi = volume of the float immersed in the static fluid.
- dd = density of the static or damping fluid.

In the above situation, for a given gaseous flow rate, Vg+Vi is constant. However, in operation of the flowmeter as the flow of gas increases, the relation of Vg to Vi will be variable. This variability extends between the range from Vi>Vg through Vi=Vg to a maximum value of Vi<Vg.

From the above it will be appreciated by those skilled in the art that the flowmeter will not only be of variable area but also variable effective weight of the float.

In the improved flowmeter of the present invention, only the connecting means moves variably through the static or damping fluid and the essentially nonbuoyant gaseous media. This being the case according to the present invention, by varying the density of the connecting means along the length thereof, it is possible to obtain a flowmeter having a linear scale, or scales of other preferred geometry. Additionally, by providing a variable density connecting means in combination with a static fluid of cooperating density, an improved sensitivity or rangeability may be obtained with the low end of the scale range.

As will be appreciated by those skilled in the art and from the equations 1 through 4 as described hereinbefore, the effective weight of the indicator means is dependent upon the ratio of the density of the immersed portion of the connecting means and the density of the static fluid. By selecting an appropriate ratio, a flowmeter of improved range may be obtained. In addition, an improved sensitivity, particularly at the low end of the range is provided. The range as well as being dependent upon the ratio as described hereinbefore is also dependent upon the combined weight of the first and second pistons and the connecting means such that the selected combined weight will vary proportionately to the increased flow rate to be measured.

The factors upon which the range depends are thus the density of the connecting means, the density of the static fluid and the effective combined weight, respectively. The effective combined weight may be varied in several different ways including providing connecting means of various uniform diameters. Alternatively, the connecting means may be of conical configuration or of any other suitable configuration.

Therefore, it is a primary objective of the present invention to provide an improved flowmeter for measuring the flow of a gaseous media that overcomes the aforementioned inadequacies of the prior art flowmeters and provides an improvement which significantly contributes to the rangeability of the flowmeter and the linearity of the scale thereof.

Another object of the present invention is the provision of a flowmeter having an improved sensitivity at the low end of the range.

Another object of the present invention is the provision of a flowmeter having a scale of improved linearity.

Another object of the present invention is the provision of a flowmeter for measuring the rate of flow of a gaseous media, the flowmeter including a first piston and a second piston connected to the first piston by connecting means. The second piston is immersed in a static or damping fluid and the connecting means has a variable density along the length thereof.

Another object of the present invention is the provision of a flowmeter for measuring gaseous flow rates in which the density of the static fluid in relation to the variable density of the connecting means provides an improved rangeability of the flowmeter.

Another object of the present invention is the provision of a flowmeter for measuring gaseous flow rates in which the cross sectional area of the connecting means varies along the length of the connecting means.

Another objective of this invention to provide a variable area flowmeter utilizing a float within and extending from a vertically oriented cylinder within an orificed core tube which overcomes deficiencies in the prior art.

Another object of this invention is to provide a variable area flowmeter utilizing tapered slot means and slots of various geometries producible without sophisticated machinery to allow full range capabilities in terms of flow rate.

Another object of this invention is to provide a variable area flowmeter wherein an effective pulsation damping means is provided therein without the cost and complications of a pitot or snorkel as found in my prior patent, U.S. Pat. No. 3,691,834.

Another object of this invention is to provide a variable area flowmeter which also eliminates unwanted flow components and the built-in pressure drop requirements inherent to the pitot or snorkel tube.

Another object of this invention is to provide a variable area flowmeter which generates signals for remote readout flow control and the like without sacrifice of inherent visual readout at the meter.

Another object of this invention is to provide a variable area flowmeter which is linear for an extremely wide variation in flow rates and density of fluid materials.

Another object of this invention is to provide a variable area flowmeter with means to provide departure from linearity when desired over full or upper range in either increasing or decreasing increments of displacement per unit of flow rate increase.

Another object of this invention is to provide a variable area flowmeter with a demonstrated accurate flow rate reading to one percent (1%) of full capacity.

The foregoing has outlined some of the more pertinent objects of the invention. These objects should be construed to be merely illustrative of some of the more prominent features of the intended invention. Many other beneficial results can be attained by applying the disclosed invention in a different manner of modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with specific embodiments shown in the attached drawings. For the purpose of summarizing the invention, the invention may be incorporated into a flowmeter for measuring the flow rate of a fluid comprising a body portion including a fluid inlet and a fluid outlet. The body portion is vertically disposed to receive a vertically disposed core tube located within the body portion in fluid communication with the fluid inlet. Recess groove means extend along the core tube to provide a fluid path adjacent the core tube. The recess groove or slot means is in fluid communication with at least the fluid outlet of the body portion. A piston is located within the core tube to provide a variable amount of cross-sectional area of the recess groove to the fluid inlet upon movement of the piston along the core tube. When fluid flow rate changes, a momentary pressure change moves the piston along the core tube to expose a different orifice area to restore equilibrium which exists when the fluid pressure within the core tube exactly equals the pressure exerted by the piston. Means are provided for indicating the position of the piston for determining the flow rate of the fluid.

In a more specific embodiment of the invention, the fluid output is located above the fluid input whereby the piston is forced upwardly with the indicator and damper being positioned below the piston. This is in contrast to my prior patent wherein the damper or indicator was positioned above the piston. In a similar manner, the core tube is oriented to be concentric with the body portion creating an annular space between. In this invention, one end of the core tube is sealed into the body portion thereby requiring all fluid entering the fluid inlet to flow through the core tube and recess groove means. In one embodiment, the recess groove means includes a tapered groove having a variable cross-sectional area along the length of the core tube. In another embodiment, the recess groove means includes a through slot extending through the core tube.

A sight tube or cover tube is secured to the lower region of the body portion for encompassing the indicator or damper. A scale may be fixed to the sight tube for cooperation with the indicator to provide a visual indication of the fluid flow rate. The advantage of this invention over the prior art includes the damper or the indicator being disposed below the piston. This enables the indicator or damper to be damped by the fluid contained within the cover or sight tube which enters the fluid inlet.

For gaseous fluids, a damping liquid may be inserted into the cover tube to dampen the action of the piston when measuring a gaseous fluid. With liquid, the media will fill the cover tube and dwell in an essentially static mode thus providing damping and constant buoyancy without the pitot or snorkel tube found in my prior patent.

Various forms of indicating means may be incorporated with the present invention. In one embodiment, the indicating means includes a magnetic means for sensing the position of the piston. The magnetic means may be coupled through a non-magnetic material to a magnetic indicator for giving a visual indication of the position of the piston. In another embodiment, the magnetic means may include a linear varible differential transformer. In still another embodiment, the magnetic means may include a plurality of magnetic switches disposed along the path of movement of a magnetic indicator for activating electrical circuits in accordance with the position of the indicator. Photoelectric or radiation type indicators are also suitable for use with the present invention.

More specifically, the present invention provides a flowmeter for measuring the flow rate of a gaseous media. The flowmeter comprises a body portion including a gas inlet and a gas outlet. A gaseous path extends between the inlet and the outlet and a core tube is disposed vertically within the body portion. A recessed groove defined by the core tube extends longitudinally relative to the core tube and a first piston is movably disposed within the core tube. The first piston is disposed adjacent the groove and a cross sectional area of the gaseous path is defined by the groove and the first piston. The cross sectional area of the gaseous path is variable dependent upon the longitudinal disposition of the first piston relative to the groove. A cover tube is disposed adjacent the body portion and in gaseous communication with the gaseous path. A second piston is movably disposed within the cover tube and connecting means connect the first and second pistons enabling the pistons to move in unison. A first and a second side of the second piston is immersed in a static fluid disposed within the cover tube enabling the static fluid to be disposed on the first and second sides of the second piston. The flowmeter includes an indicator means cooperating with the second piston for indicating the position thereof relative to the cover tube to indicate the gaseous flow rate between the gas inlet and outlet.

The indicator is operative within a range which is partially dependent upon the buoyancy of the connecting means immersed in the static fluid.

More particularly, the range is further dependent upon the combined weight of the first and second pistons and the connecting means. The effective combined weight is varied in accordance with the required range by virtue of the ratio of the density of the connecting means to the density of the static fluid. Furthermore, the range of the indicator is varied in accordance with the physical shape of the connecting means.

The foregoing has outlined rather broadly the more pertinent and important principles of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 47 is a graph showing readings from the flowmeter of FIGS. 45 and 46. The curve of the graph approaches exponential and is in comparison with the curve shown in FIG. 35.

FIG. 48 is an elevational view partially in section of another embodiment of the present invention providing in one flowmeter a variety of selectable ranges. The slidable weight is shown in the position suitable for measuring relatively low flow rates.

FIG. 49 is an elevational view partially in section of the embodiment of FIG. 48 showing the slidable weight in the position suitable for measuring relatively high flow rates.

FIG. 50 is a sectional view taken on the line 50—50 of FIG. 48.

FIG. 51 is a graph showing readings from the flowmeter of FIG. 48 when used for measuring relatively low flow rates.

FIG. 51A is an enlargement of the graph shown in FIG. 51 taken in the vicinity of the position I.

FIG. 52 is a graph showing readings from the flowmeter of FIG. 48 when used for measuring relatively high flow rates as shown in FIG. 49.

FIG. 52A is an enlargement of the graph shown in FIG. 52 taken in the vicinity of position II.

FIG. 53 is an elevational view partially in section of a further embodiment of the invention showing a connecting means of uniform cross section including a conical cavity.

FIG. 54 is an elevational view partially in section of a further embodiment of the invention showing a connecting means having a density that is variable throughout the length thereof.

Similar character references refer to similar parts throughout the several views of the drawings.

DETAILED DESCRIPTION

FIGS. 1–4 illustrate a first embodiment of the invention which is an improvement upon my prior patent, U.S. Pat. No. 3,691,834. In many respects, the instant invention operates in a manner similar to my prior patent and accordingly the explanations of linearity and the like will be incorporated by reference into the instant specification.

Figures 1, 2, 3, 5, 6:
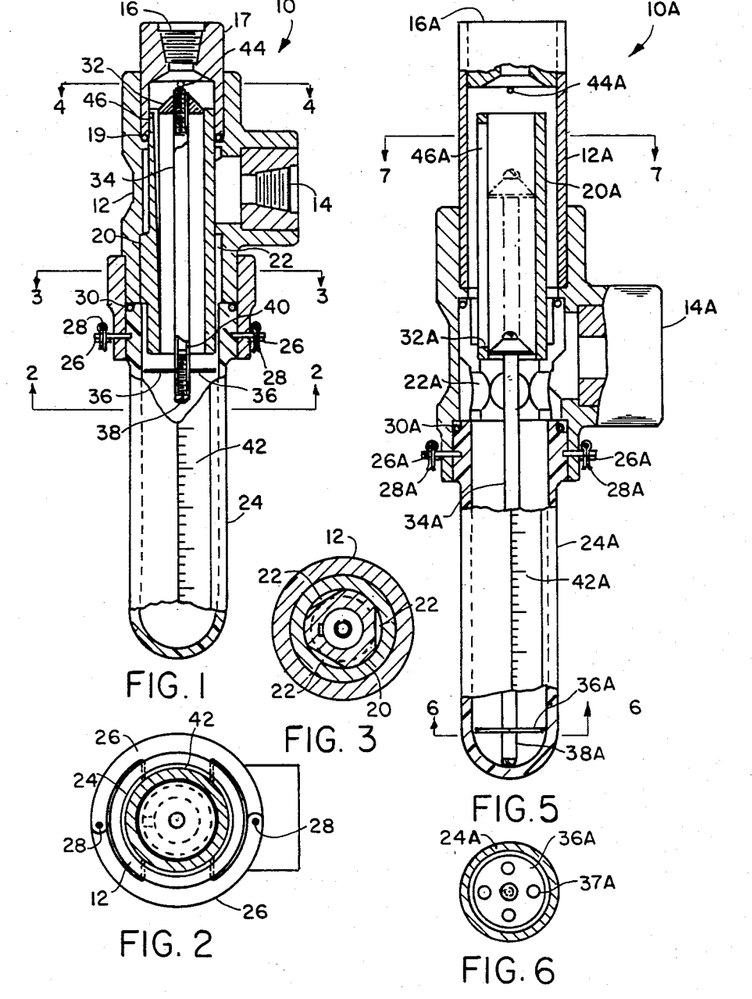
FIG. 1 is an elevation view partially in section of a first embodiment of the flowmeter for measuring low flow rates of liquids and dense gases.
FIG. 2 is a sectional view taken along line 2—2 of FIG. 1.
FIG. 3 is a sectional view taken along line 3—3 of FIG. 1.
FIG. 5 is an elevation view partially in section of a second embodiment of the flowmeter for measuring medium flow rates of liquids and gases.
FIG. 6 is a sectional view taken along line 6—6 of FIG. 5.
Figure 4:
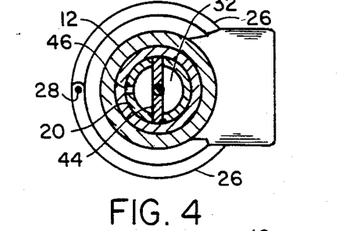
FIG. 4 is a sectional view taken along line 4—4 of FIG. 1.

The flowmeter 10 comprises a body portion 12 which may be constructed of a plastic or metallic material and may be constructed from standard metal or plastic sockets, tees, pipes, rods and the like. The body portion comprises a fluid inlet 14 and a fluid outlet 16 with the fluid inlet 14 being disposed below the fluid outlet 16. In this embodiment, the fluid outlet comprises a separate threaded fitting 17 sealed by conventional means such as solvent cementing, but it is understood that the unit may incorporate an integral output member.

A core tube 20, being of a substantially cylindrical configuration, is mounted to be coaxial with the body portion and forming a seal at O-ring 19 while ensuring that all fluid entering the input 14 flows through the core tube 20. Input passageways 22 enable the input fluid to flow between the body portion 12 and the outer surface of the core tube 20 to enter a region defined by a cover tube or sight tube in transparent versions which define the region below the core tube 20. The physical positioning of the cover tube 24 below the fluid inlet 14 ensures that liquid fluid will always flow through liquid passage 22 to entirely fill the cover tube 24 prior to flowing through the core tube 20. The significance of this aspect of the invention will become apparent from the following description.

The cover tube 24 is secured to the body portion 12 by plural lock rings 26 secured together with pins 28 but it should be understood that various other means may be utilized for securing the cover tube to the body portion. An O-ring 30 ensures proper sealing between the cover tube 24 and the body portion 12.

The flowmeter 10 also includes a piston 32 which is movably mounted within the core tube 20 and connected by a tubular connector 34 to an indicator and damper 36. The piston 32 is selected to slide freely within the core tube 20 without substantial loss of the fluid flow therebetween. The indicator or damper 36 is illustrated as a flat disc-shaped member which is free to slide within the cover tube 24 yet allows fluid to flow therearound. In some applications, apertures 37A drilled in the indicator or damper disc 36 as shown in FIG. 6 may be suitable for various measurements.

The tubular connector 34 includes an adjustment screw 38 which may be threadably inserted and removed from the tubular connector in order to add mass shown as slot 40 to the tubular member to calibrate the weight of the piston unit comprising piston 32, tubular connector 34 and indicator or damper 36 relative to a scale 42 which is located in a fixed position relative to the cover tube 24. The lower motion of piston 32 is fixed by the bottom of screw 38 contacting the bottom of the cover tube 24 whereas the top movement of the piston is fixed by a stop rod 44.

An important aspect of the present invention is the use of a tapered recessed groove 46 which tapers from a small cross-sectional area near the lower portion of the core tube 20 to a larger cross-sectional area in the upper portion of the core tube. The use of a tapered recessed groove improves the low volume flow at full capacity over my prior patent, U.S. Pat. No. 3,691,834. In addition, the inverted nature of the cover tube 24 and the fact that the indicator or damper 36 is always immersed in a fluid when liquid is being used, eliminates the requirement of the pitot tube or snorkel as required in my prior patent. The two important distinctions have resulted in a large turndown ratio enabling the flowmeter to have wide applications in the art. Presently, a 25 gallon per hour flowmeter of the rotameter type is usually incapable of reading flow rates below 2–3 gallons per hour. The flowmeter disclosed in the first embodiment of my invention has demonstrated the capability of measuring flow rates down to 0.25–0.50 gallons per hour for the same 25 gallon per hour full capacity flowmeter. The improvements of my new invention are readily apparent over the prior art, including my own U.S. patent.

Figure 7:
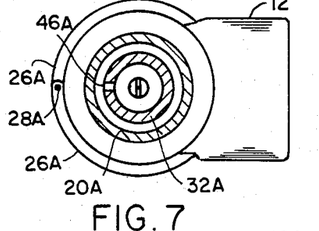
FIG. 7 is a sectional view taken along line 7—7 of FIG. 5.

FIGS. 5–7 illustrate a second embodiment of my invention which utilizes a through slot core tube and provides a different fluid input which is more suitable for use in measuring medium flow rates of liquid and dense gases. Similar parts are labeled with similar reference numerals followed by the letter A as in FIG. 1. In this second embodiment, the flowmeter 10A comprises a body portion 12A having a fluid inlet 14A and a fluid outlet 16A. A core tube 20A is concentrically disposed in body portion 12A with an input passage 22A shown as a plurality of apertures connecting the fluid inlet 14A with the internal area of the core tube 20A. A cover tube 24A is secured by similar locking rings 26A to the body portion 12A with an O-ring seal 30A. A piston 32A is similarly disposed upon a tubular connector 34A to the indicator or damper 36A. In this embodiment, the damper 36A includes an optional plurality of apertures 37A for lessening the damping action thereof, if desired.

In this embodiment, the recessed groove 46A is a through slot in a manner similar to my prior patent. However, the unique feature of the cover tube or sight tube 24A located below the body portion 12 and the fluid inlet 14A similarly eliminates the requirement for the pitot tube or snorkel, thus adding to the desirability of the instant invention. Turndown ratios in excess of 50 to 1 have been demonstrated.

Figure 8:
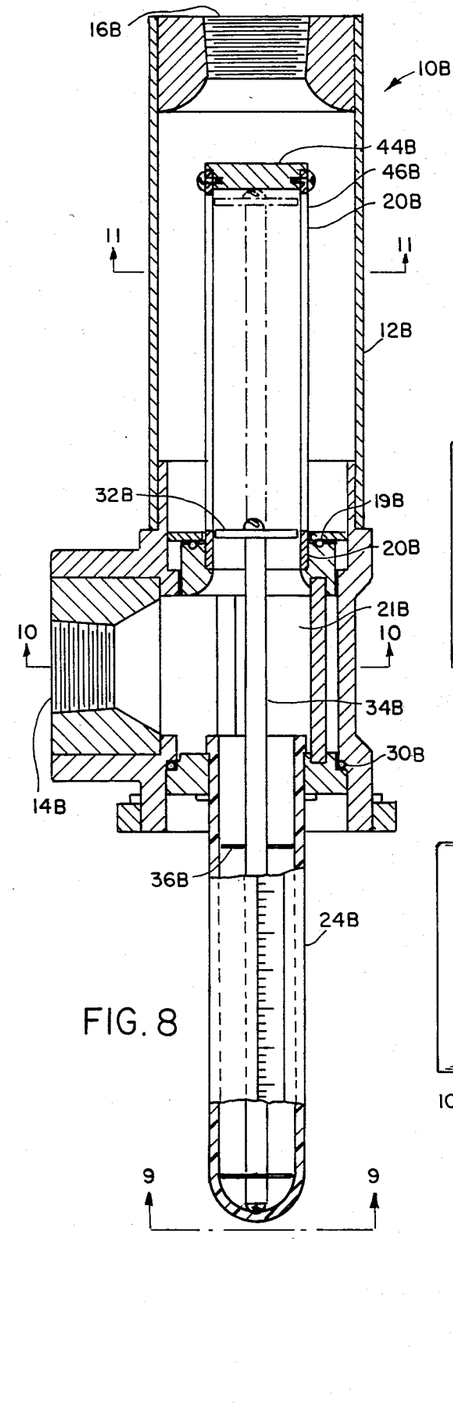
FIG. 8 is an elevation view partially in section of a third embodiment of the flowmeter for measuring low to high flows of low density gases and with very low flow resistance.
Figure 9:
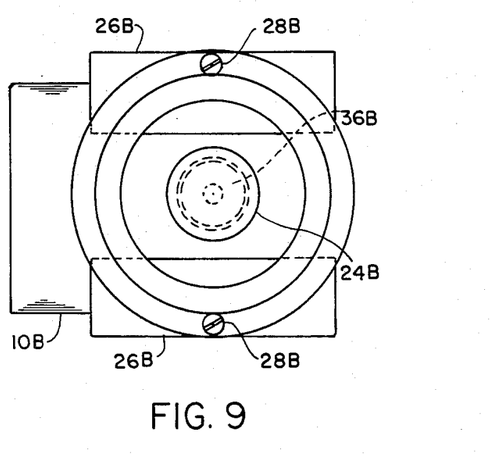
FIG. 9 is a partial bottom view taken along 9—9 of FIG. 8.
Figure 10:
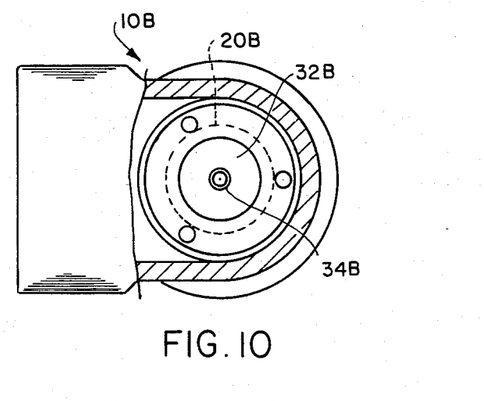
FIG. 10 is a sectional view taken along line 10—10 of FIG. 8.
Figure 11:
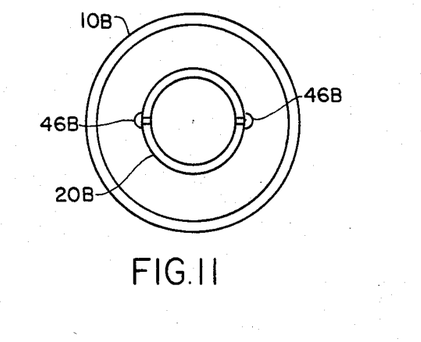
FIG. 11 is a sectional view taken along line 11—11 of FIG. 8.

FIG. 8 illustrates still a further embodiment of my invention showing a flowmeter particularly suited to measuring low to high flows of low density gases with very low fluid resistance. In a similar manner, similar parts are labeled by similar reference numerals followed by the letter B. In this embodiment, the flowmeter 10B utilizes the body portion 12B having a fluid inlet 14B and a fluid outlet 16B. In this embodiment the input passage is eliminated and a plenum 21B is utilized for the high flow rate gas. A cover tube 24B is similarly secured to the body portion with the core tube 20B receiving piston 32B connected by tubular connector 34B to the indicator or damper 36B. In this embodiment, stop rod 44 is replaced by a stop cap 44B with plural through slots 46B being disposed on opposed sides of the core tube 20B. Lock rings 26 are replaced with lock bars 26B and pins 28 with the screws 28B. The invention shown in FIGS. 8–11 has the distinct advantage of enabling a liquid to be placed within cover tube 24 while a gas fluid is measured entering input 14B. The damping liquid within the cover tube 24B enables the positive damping of piston 32 while the flow rate of the gas is measured entering the fluid inlet 14B. The present invention enables a gas/liquid cooperation for measuring the flow rate of gases in a properly damped manner which was totally impossible with my prior patent. The open end of the cover tube extends upwardly into the plenum and may extend further. This prevents carryover of damping into the flowing media as could occur if the damping fluid foams as may happen with gas media of varying pressure. Turndown ratios of 100 to 1 have been demonstrated with this embodiment.

The operation of the flowmeters shown in FIGS. 1–11 should be apparent from the foregoing discussion and also in view of the disclosure of my prior patent. Essentially, the mass of the piston tubular connector and the indicator or damper provides a constant head against which the fluid pressure exerts a force to raise the piston in core tube 20. The piston is raised until the cross-sectional area of the recessed groove provides a release of pressure fluid to equilibrium with the piston exerted pressure thereby providing a unique and single position of the indicator or damper with respect to the scale for a given fluid flow. The range, turndown ratio and full capacity for a particular application requirement are achieved by proper design of piston weight, slot area and slot geometry. The use of a cover tube below the fluid inlet enables the fluid in terms of a liquid or gas to operate on both sides of the damper in addition to enabling the liquid/gas interface as described with reference to FIG. 8. It should be appreciated by those skilled in the art that such liquid/gas interface is not limited to the embodiment shown in FIG. 8 but is equally applicable to all the embodiments of the present invention.

Figures 12, 15, 20:
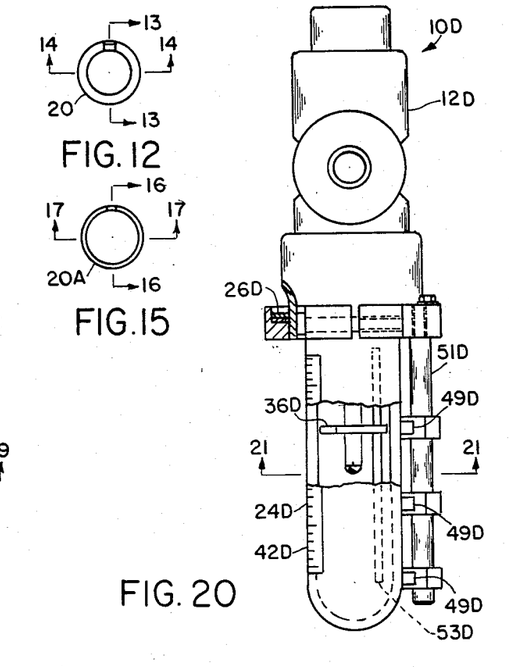
FIG. 12 is a top view of a core tube utilized in FIGS. 1-4.
FIG. 15 is a top view of a through slot core tube as illustrated in FIGS. 5-7.
FIG. 20 is another variation of the invention utilizing magnetic switch means.
Figure 13:
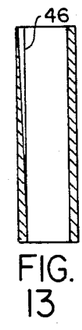
FIG. 13 is a sectional view taken along line 13—13 of FIG. 12 showing in greater detail the tapered recess.
Figure 14A:
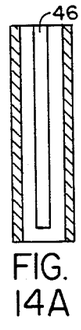
FIGS. 14A-14C illustrate various modifications of the recess as seen from section line 14—14 of FIG. 12.
Figure 14B:
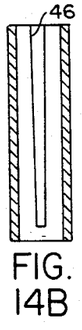
Figure 14C:
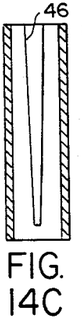

FIG. 12 is a top view of a core tube which is utilized to show in greater detail the sections taken for FIGS. 13 and 14. FIG. 13 is a side sectional view along line 13—13 showing in greater detail the tapered groove shown in FIG. 1. FIG. 14A is a view along line 14—14 of the tapered groove 46. FIG. 14B is another variation of the tapered groove wherein the groove is tapered in two dimensions, namely the dimension as shown in FIG. 13 in addition to the dimension shown in FIG 14B. It should be appreciated that such variation is a linear variation of area. FIG. 14C illustrates a curved or exponential variation in the dimension shown in FIG. 14B but a linear variation in the taper as shown in FIG. 13.

Figure 16:
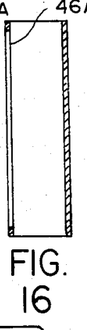
FIG. 16 is a sectional view along line 16—16 of FIG. 15.
Figure 17A:
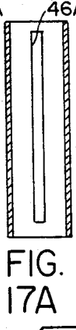
FIGS. 17A-17C illustrate various modifications of the recess as seen from section line 17—17 of FIG. 15.
Figure 17B:
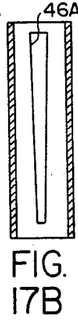
Figure 17C:
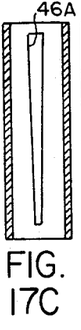

FIG. 15 is a top view of a core tube having a through aperture as shown more clearly in FIG. 16 which may be suitable for the flowmeters shown in FIGS. 5 and 8. In this embodiment, FIGS. 17A–17C illustrate various variations of the taper of recess slot 46. FIG. 17A illustrates a linear dimension of slot 46 whereas FIG. 17B illustrates a linear taper whereas FIG. 17C illustrates an exponential taper of the through slot 46. Numerous variations and combinations of these slots may be provided for in each of the various embodiments of this invention. Such variations should be construed as within the scope of the disclosed invention.

Figure 18:
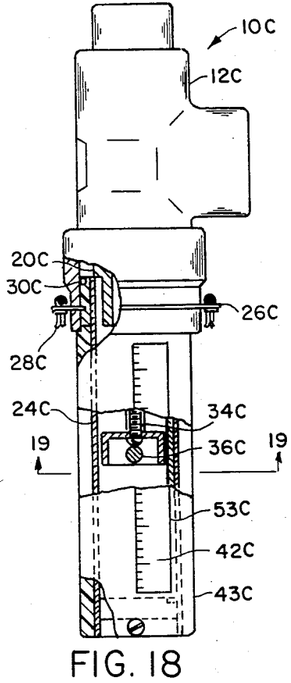
FIG. 18 is a modification of the invention utilizing a magnetic indicator means.
Figure 19:
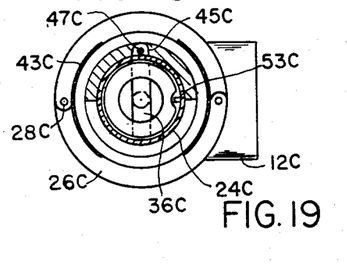
FIG. 19 is a sectional view along line 19—19 of FIG. 18.

FIGS. 18 and 19 show a modification of the invention utilizing a magnetically linked indicator means. In many instances, the application precludes the use of a transparent plastic or glass cover tube but a mechanical indication of the flow rate is desirable. In this embodiment the cover tube 24C comprises a metallic but non-magnetic material with the indicator 36C comprising a magnet fixed relative to the tubular connector 34C. A scale 42C is disposed on the outer periphery of a transparent half-tube 43C encircling the cover tube 24C. The transparent half-tube 43C includes a slot 45C extending along the length of the transparent tube 43C. Captive, but freely vertically movable in slot 45C is a ball of magnetic material 47C which positions itself adjacent the magnet indicator 36C by virtue of the magnetic field propagating through the non-magnetic cover tube 24. Accordingly, a mechanical and visual indication of the metallic ball 47C is given relative to the scale 42C by action of the magnetic field of the indicator 36C through the non-magnetic cover tube 24C.

Figure 21:
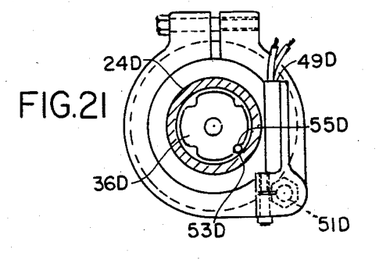
FIG. 21 is a sectional view along line 21—21 of FIG. 20.

FIGS. 20 and 21 illustrate a further modification of the magnetic means wherein a magnetic indicator or damper 36D gives a visual indication of the flow rate relative to a scale 42D disposed upon a transparent cover tube 24D. In addition thereto a plurality of magnetic switches 49D are positioned adjacent the non-metallic transparent cover tube 24D for providing external signals depending upon the position of the magnetic switches and the position of the indicator or damper 36D. It should be apparent that the magnetic switches may be adjustably moved vertically for flow range adjustment, horizontally (arc) for differential adjustment, on an adjustment rod 51D. An index rod 53D cooperates with an indent 55D in the indicator 36D for maintaining the proper orientation of the magnet in damper 36D. A similar arrangement is shown with respect to FIGS. 18 and 19.

Figures 22, 23, 24, 25:
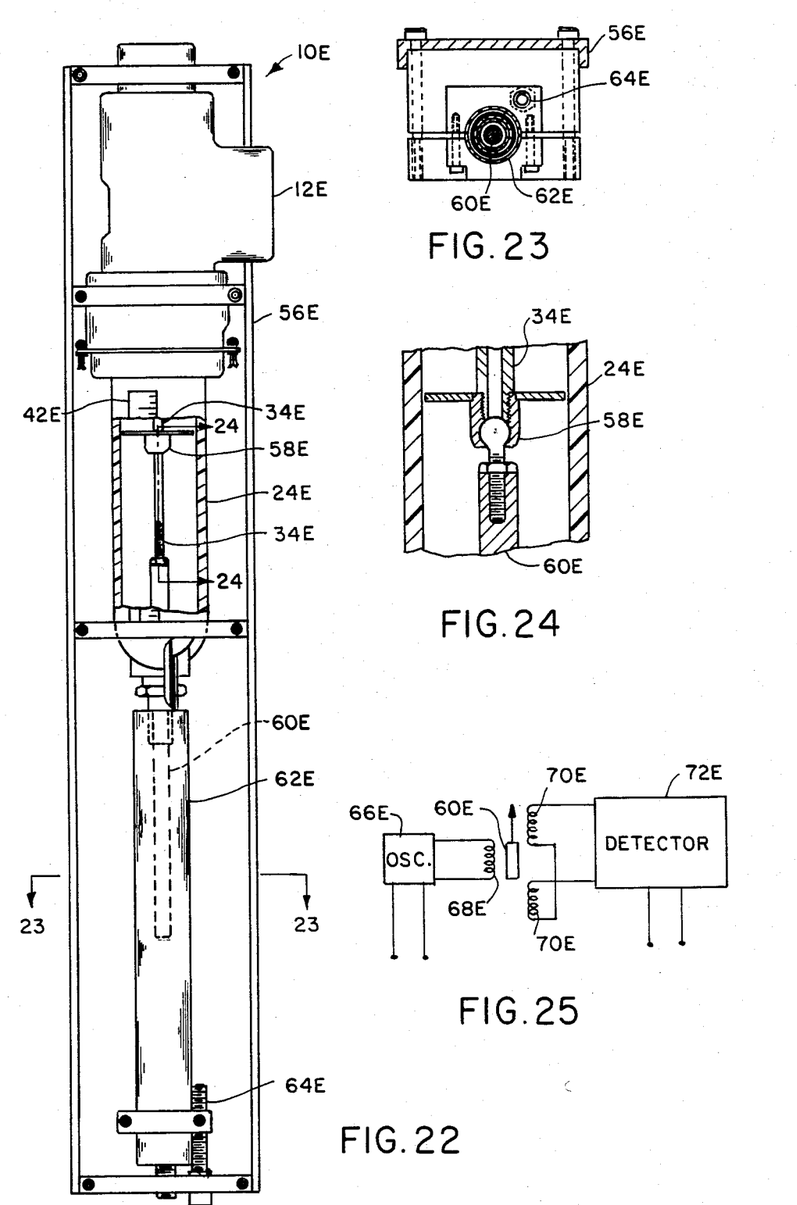
FIG. 22 is another variation of the invention utilizing a magnetic means comprising a linear variable differential transformer.
FIG. 23 is a sectional view along line 23—23 of FIG. 22.
FIG. 24 is a sectional view showing a detailed coupling of FIG. 22.
FIG. 25 is a schematic diagram of an electronic circuit for the magnetic sensor of FIG. 22.

FIGS. 22-25 illustrate a further variation of the invention wherein the flowmeter 10E actuates a linear variable differential transformer. In this embodiment, the entire body portion 12E of the flow meter 10E is enclosed within a housing 56E with the tubular connector 34E coupled through a ball joint 58E as shown in FIG. 24, to a core 60E of a linear variable differential transformer 62E. An adjustment screw 64E is provided for adjusting the relative position of the transformer relative to the flowmeter 10E. The position of the piston (not shown) within the flowmeter 10E determines the position of the core 60E relative to the transformer 62E. FIG. 25 illustrates a brief schematic diagram of the linear variable differential transformer wherein current is applied to oscillator 66E to provide a constant voltage at high frequency to the input driving coil 68E. Sensor coils 70E sense the position of magnetic core 60E to provide the detector 72E with data for determining the position of the piston within the flowmeter 10E. Various types of logic and control circuits 72E may be utilized with the invention as set forth herein.

Figures 26, 27, 28, 28A, 29, 29A:
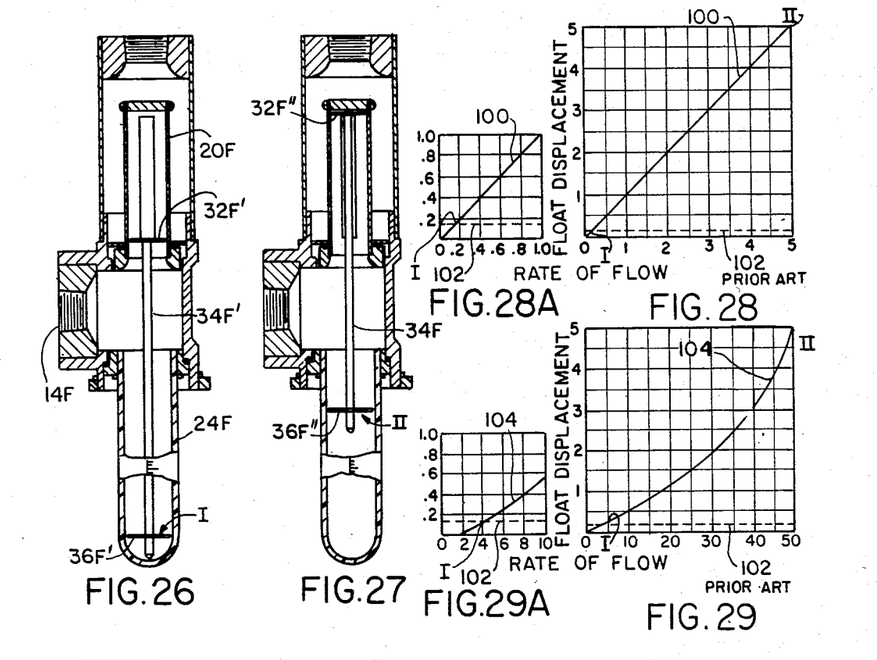
FIG. 26 is an elevational view partially in section of a variable area gaseous flowmeter showing the indicator in position I of the low end of the range and without static fluid.
FIG. 27 is an elevational view partially in section showing the flowmeter of FIG. 26 but with the indicator in position II at the upper end of the range.
FIG. 28 is a graph of rate of flow to flow displacement of the prior art flowmeter of FIGS. 26 and 27 wherein the combined weight is low and suitable for measuring relatively low flow rates.
FIG. 28A is an enlargement of the graph shown in FIG. 28 taken in the vicinity of the position I and showing the range of the prior art low flow rate flowmeters in the low end of the range.
FIG. 29 is a graph showing readings from a flowmeter of the type shown in FIGS. 26 and 27 but in which the combined weight is relatively high and suitable for measuring relatively high flow rates.
FIG. 29A is an enlargement of the graph shown in FIG. 29 taken in the vicinity of the position I and showing the improved range over the prior art high flow rate flowmeters.

FIG. 26 shows a flowmeter having a variable area groove and cooperating first piston 32F'. The first piston 32F' is connectably spaced from a second piston 36F' by a connecting means 34F'. When the flowmeter is used to measure the flow of a gaseous media, the gas enters the flowmeter via the gas inlet 14F and lifts the first piston 32F', the connecting means 34F' and the second piston 36F' until the force exerted by the flowing gas is in exact equilibrium with the combined weight of the pistons 32F' and 36F' and the connecting means 34F'. In the prior art flowmeters, no static fluid or damping liquid is contained in the cover tube 24F. In order for the piston 34F' to slide within the bore of the core tube 20F, a certain clearance must be provided between the cylindrical wall of the piston 32F' and the bore of the core tube 20F. This clearance which is an unavoidable mechanical requirement for the operation of the flowmeter, permits a degree of leakage of gas between the piston 32F' and the bore of the core tube 20F such that at very low flow rates gas may leak past the piston 32F' without lifting the piston 32F' and the connected piston 36F'. Therefore, particularly at the low end of the range of the prior art flowmeter, the range and consequently the sensitivity of the flowmeter is rather limited.

FIG. 27 shows the prior art flowmeter of FIG. 26 but with a maximum readable gaseous flow rate. At this maximum readable flow rate, the pistons 32F' and 36F' and connecting means 34F' have moved from the position I as shown in FIG. 26 to the position II as represented by the references 32F'', 36F'' and 34F'', respectively.

FIG. 28 is a graph representing a curve 100 generated by plotting a plurality of flowmeter readings or float displacement readings against a plurality of corresponding calibrated rate of flow readings. In the graph of FIG. 28, the calibrated flow rates are indicated in units within the range 0 to 5. Similarly, the float displacement or movement of the pistons 32F' and 36F' and connecting means 34F' is indicated on the vertical axis in units within the range 0 to 5. The horizontal dash line 102 indicates the practical minimum readable displacement due to the aforementioned leakage of gas between the piston 32F' and the core tube bore. The intersection of the curve 100 of FIG. 28 and the horizontal dash line 102 is represented by the position I and indicates the minimum readable flow rate. The maximum displacement of the float is represented by position II and indicates the maximum readable flow rate. Any point between position I and II on curve 100 falls within the range of the flowmeter. For purposes of comparison and as well known to those skilled in the art, the rangeability of the flowmeter or turn down of the flowmeter is represented by the ratio of the rate of flow at the maximum flow rate as represented by the II to the minimum flow rate as represented by I. Relating to readings of FIG. 28 and the rangeability of the prior art flowmeter, position II=5 while position I=0.15. The rangeability is therefore 5.0 to 0.15 or 5.0/0.15=33.3:1. The graph of FIG. 28 represents the prior art flowmeter as applicable to the measurement of the gaseous media having a relatively low flow rate in which case the pistons 32F' and 36F' and connecting means 34F' are relatively light. When the prior art flowmeter is used for measuring relatively low flow rates, a substantially linear curve 100 may be obtainable.

However, when the prior art flowmeter is used to measure relatively high flow rates, the combined weight of the pistons 32F' and 36F' and connecting means 34F' are, of necessity, relatively heavy to overcome the maximum flow rate reading from 5 to 50. In practical terms, if such maximum flow rate readings are to be increased from 5 to 50, the combined weight must be increased 100 times as shown hereinbefore with reference to equation 1, namely $$Dg = As \times \sqrt{Wf} \; (\sqrt{100 \div 1} = 10)$$

With reference FIG. 29, the curve 104 represents a plurality of rate of flow readings plotted against float displacement when the prior art flowmeter is used to measure relatively high flow rates. As indicated by the new position II and I, respectively, the rangeability under high flow rate conditions becomes 50:4=12:5:1. In addition to the decrease in rangeability under high flow rates conditions, it is also observed that the curve 104 sweeps upwardly as the flow rate increases. This upward sweep of curve 104 is usually undesirable.

FIGS. 28A and 29A are enlargements of graphs of FIGS. 28 and 29, respectively, and show in greater detail the relative positions of the minimum flow rate readings with reference to a low flow rate and a high flow rate condition, respectively.

Figures 30, 31, 32A:
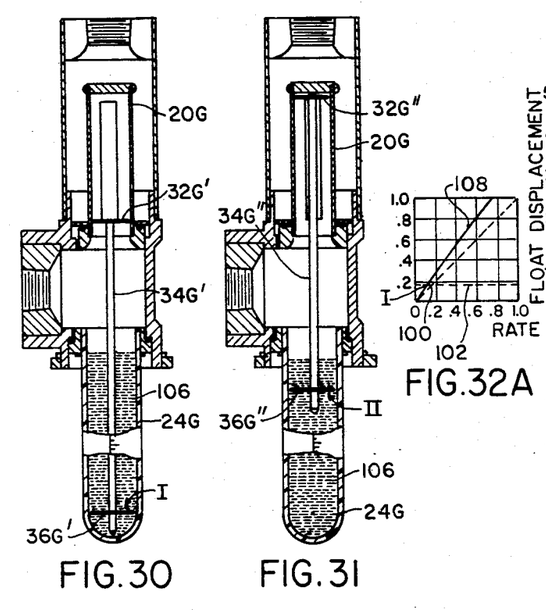
FIG. 30 is an elevational view partially in section of one embodiment of the present invention wherein the combined weight is relatively low and suitable for relatively low flow rate measurements. The indicator is in position I at the low end of the range.
FIG. 31 is an elevational view partially in section of the flowmeter of FIG. 30 but showing the indicator in the position II at the upper end of the range.
FIG. 32A is an enlargement of the graph shown in FIG. 32 taken in the vicinity of the position I and showing the improved range of the flowmeter in the low end of the range.

FIG. 30 shows an improved flowmeter according to the present invention. In the embodiment shown in FIG. 30, the cover tube 24G is partially filled with a damping liquid or static fluid 106. The second piston 36G' is totally immersed in the static fluid 106 while a portion of the connecting means 34G' is immersed in the fluid 106 dependent upon the disposition of the piston 32G' within the core tube 20G.

FIG. 31 shows the pistons 32G' and 36G' and connecting means 34G' in the position II indicating the maximum flow rate of gas. In this maximum position, the float combination is represented by 32G", 36G" and 34G", respectively. When the float combination is in the position II, the level of the static fluid 106 will drop. The embodiment shown in FIGS. 30 an 31 relate to a flowmeter for measuring relatively low flow rates. Accordingly, the effective combined weight of the pistons 32G' and 36G' and connecting means 34G' is relatively low. Additionally, the density of the connecting means 34G' is relatively high and the density of the static fluid 106 is relatively low. In this manner, there is low buoyancy relative to the float combination. This buoyancy is maximum in the vicinity of the position I as applicable to measuring flow rates at the low end of the range. Said buoyancy gradually decreases as the flow rate increases because as the flow rate increases, less of the connecting means 34G' is immersed in the static fluid 106.

Figure 32:
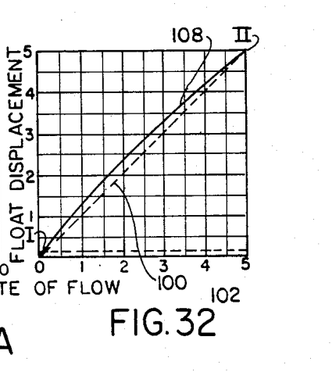
FIG. 32 is a graph showing readings from the flowmeter of FIGS. 30 and 31. The curve of the graph is in comparison with the curve shown in FIG. 28.

FIG. 32 is a graph showing readings taken between positions I and II. A curve 108 represents these readings in comparison with the curve generated by the prior art flowmeter. As clearly shown on the graph, the range of the flowmeter of FIGS. 30 and 31 is an improvement over the prior art. FIG. 32A is an enlargement of the respective curves 108 and 100 in the vicinity of position I. As shown in the graphs 32 and 32A, the rangeability of FIGS. 30 and 31 is 5:0.10 or 50:1 which is a marked improvement over the rangeability of 33:1 as represented by the curve 100. Such improved rangeability also provides improved sensitivity, particularly at the lower end of the range.

For the flowmeter of FIGS. 30 and 31 to have a maximum position II equivalent to that of the prior art flowmeter of FIGS. 26 and 27, the effective combined weight of the pistons 32G' and 36G' and connecting means 34G' is chosen to be equal to the combined weight of pistons 32F", 36F", and connecting means 34F" when the connecting means 34G" is 5% immersed in the static fluid 106 as shown in FIG. 31. In practice, it has been found that at position I as shown in FIG. 30, 67% of the connecting means of 34G' is immersed.

Figure 33:
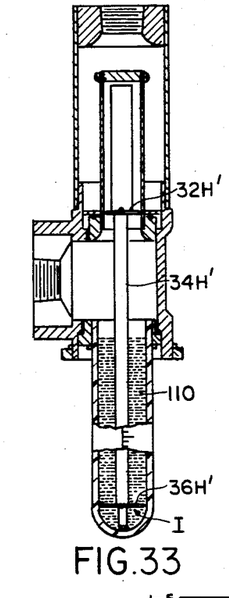
FIG. 33 is an elevational view partially in section of a further embodiment of the present invention wherein the combined weight is relatively high and suitable for measuring relatively high flow rates. The indicator is in the position I at the low end of the range.
Figures 34, 36:
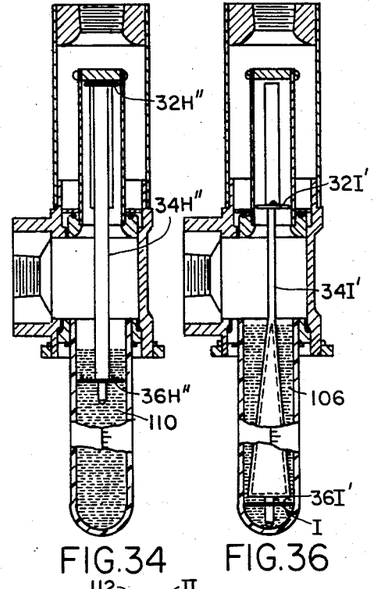
FIG. 34 is an elevational view partially in section of the flowmeter of FIG. 33 but showing the indicator in the position II at the upper end of the range.
FIG. 36 is an elevational view partially in section of another embodiment of the present invention including a connecting means of hollow conical configuration. In this embodiment the combined weight is relatively low and suitable for measuring relatively low flow rates. The indicator is in position I at the low end of the range.

FIG. 33 shows an embodiment of the improved flowmeter for measuring relatively high flow rates. In this embodiment, the combined weight of pistons 32H' and 36H' and connecting means 34H' is relatively high and in the preferred embodiment, 100 times heavier than the combined weight of the combination of the embodiment of FIGS. 30 and 31. Additionally, the density of the connecting means 34H' is relatively low and the density of the static fluid 110 is relatively high. Under these circumstances in the position I as shown in FIG. 33, because of the low density of 34H' and the high density of 110, there exists a strong tendency towards buoyancy of the connecting means 34H'. This tendency 34H' gradually decreases as the flow rate increases because as the flow rate increases, less of the connecting means 34H' remains immersed in the static fluid 110. FIG. 34 depicts the position II wherein very little of the connecting means is immersed in 110.

Figures 35, 35A:
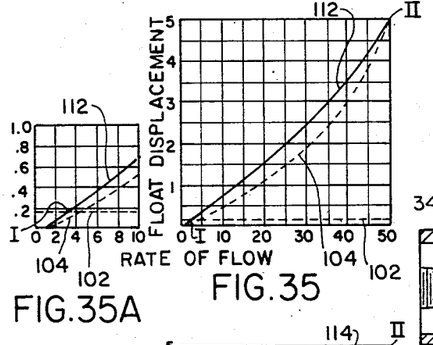
FIG. 35 is a graph showing readings from the flowmeter of FIGS. 33 and 34. The curve of the graph is in comparison with the curve shown in FIG. 29.
FIG. 35A is an enlargement of the graph shown in FIG. 35 taken in the vicinity of the position I and showing the improved range of the flowmeter in the low end of the range.

The operation of the flowmeter shown in FIGS. 33 and 34 is depicted by the curve 112 of the graph shown in FIG. 35. The curve 112 is shown in comparison with the curve 104 of FIG. 29.

FIG. 35A is an enlargement of FIG. 35 in the vicinity of position I. The rangeability of the embodiment in FIGS. 33 and 34 as represented by the curve 112 is 50:3 or 16.7:1 which is an improvement over the rangeability of the prior art flowmeter of FIGS. 26 and 27 which is 12.5:1. Additionally, an improved sensitivity at the position I or low end of the range is obtained and the curve 112 more closely approaches linearity than curve 104. This improved linearity in practice provides a more uniform flow rate scale.

Figure 37:
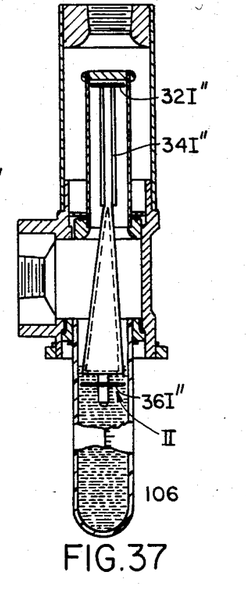
FIG. 37 is an elevational view partially in section of the flowmeter of FIG. 36 but showing the indicator in the position II at the upper end of the range.

FIG. 36 shows a further embodiment of the present invention, particularly for measuring relative low gaseous flow rates. Sensitivity and improved rangeability are provided by this embodiment as in the embodiment of FIGS. 30 and 31. For a relatively low effective combined weight of pistons 32I' and 36I' and connecting means 34I', a high density connecting means 34I' is employed. Also, the static fluid 106 is of low density. The interaction of high density connecting means 34I' and low density static fluid 106 has the tendency to reduce the buoyancy of the connecting means when in the position I as shown in FIG. 36. This buoyancy further decreases as the connecting means progresses to the position II as shown in FIG. 37. Decrease of buoyancy increases with each increment of upward travel by virtue of the conical shape. The position II of FIG. 37 is reached at maximum flow rate. However, in addition to the facts as described hereinbefore, the connecting means 34I' of FIG. 36 is of hollow conical configuration. Therefore, in practice, approximately 95% of the connecting means 34I' is immersed in static fluid 106 when in the position I. Conversely, when the connecting means 34I" is in the position II as shown in FIG. 37, only 1% of the connection means 34I" is immersed. Under these conditions, from position I to position II, the effective weight of the pistons and connecting means progresses from extremely low to comparatively high.

Figures 38, 38A:
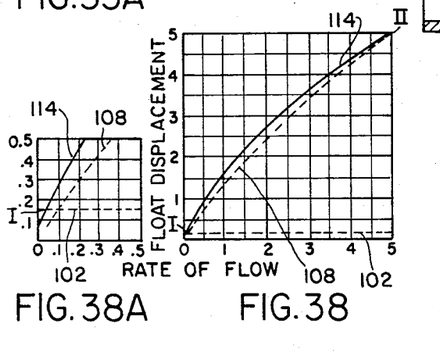
FIG. 38 is a graph showing readings from the flowmeter of FIGS. 36 and 37. The curve of the graph is in comparison with the curve shown in FIG. 32.
FIG. 38A is an enlargement of the graph shown in FIG. 38 taken in the vicinity of the position I and showing the improved range of the flowmeter in the low end of the range.

FIG. 38 shows the curve 114 representing the operation of the flowmeter of FIGS. 36 and 37. The curve 114 is shown in comparison with the curve 108 of the FIG. 32. The curve 114 indicates an improved sensitivity within the low end of the range as compared with curve 108. Additionally, the curve 114 represents an improved rangeability. The rangeability as shown by curve 114 is 5:0.05 or 100:1.

FIG. 38A is an enlargement of the graph of FIG. 38 in the vicinity of position I.

Figure 39:
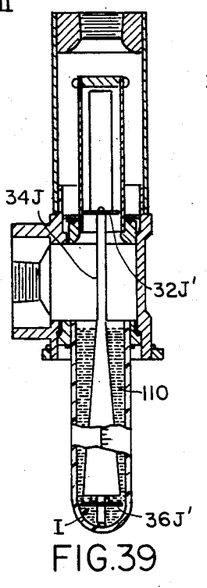
FIG. 39 is an elevational view partially in section of a further embodiment of the present invention including a connecting means of solid conical configuration. In this embodiment the combined weight is relatively high and suitable for measuring relatively high flow rates. The indicator is in the position I at the low end of the range.

FIG. 39 shows an embodiment similar to that shown in FIGS. 36 and 37. However, in the embodiment of FIG. 39, the connecting means 34J' is of solid conical configuration. This embodiment is for high flow rate measurements and incorporates the relative features of the embodiments of FIGS. 33 and 34. This embodiment incorporates a relatively heavy connecting means 34J' of low density and a static fluid of high density.

Figure 40:
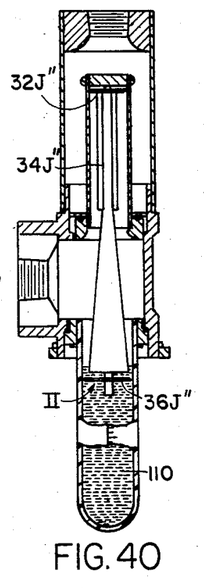
FIG. 40 is an elevational view partially in section of the embodiment shown in FIG. 39 but showing the indicator in the position II at the upper end of the range.

FIG. 40 shows the connecting means 34J" in the position II wherein only 1% of the connecting means is buoyantly immersed.

Figure 41:
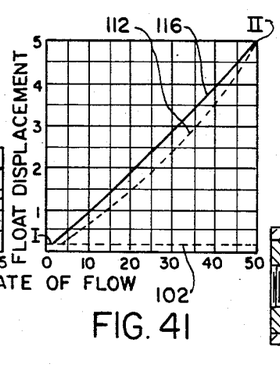
FIG. 41 is a graph showing readings from the flowmeter of FIGS. 39 and 40. The curve of the graph is in comparison with the curve shown in FIG. 35.
Figure 41A:
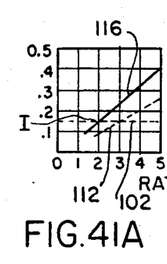
FIG. 41A is an enlargement of the graph shown in FIG. 41 taken in the vicinity of the position I and showing the improved range of the flowmeter in the low end of the range in comparison with the flowmeter having connecting means of uniform cross sectional area.

FIG. 41 shows a curve 116 representing the operation of the flowmeter of FIGS. 39 and 40. The curve 116 is in comparison with the corresponding curve 112 of FIG. 35. As shown, curve 116 approaches linearity which is a desirable feature in certain applications and the rangeability is improved over the rangeability of the operation represented by curve 112. The rangeability as represented in curve 116 is 50:2 or 25:1 whereas that of curve 112 is 16.7:1.

Figure 42:
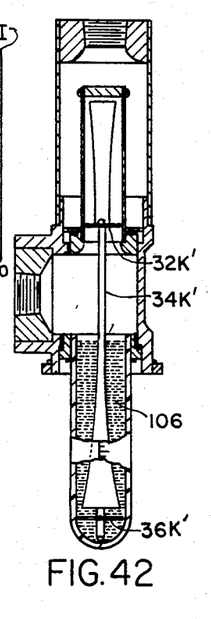
FIG. 42 is an elevational view partially in section of a further embodiment of the present invention including hollow connecting means of curved configuration. In this embodiment the combined weight is relatively low and suitable for measuring relatively low flow rates. The indicator is in the position I at the low end of the range.

FIG. 42 shows a further embodiment in which the connecting means 34K' is of curved configuration. The configuration is such that the curve 118 representing the operation of this flowmeter is substantially linear.

Figure 43:
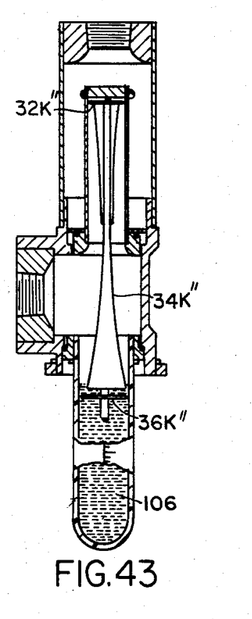
FIG. 43 is an elevational view partially in section of the embodiment of FIG. 42 but showing the indicator in the position II at the upper end of the range.

FIG. 43 shows the connecting means in position II at the upper end of the range. The shape of the connecting means 34K' is chosen to provide a linear curve 118 and may be manufactured by numerically controlled machinery as well known in the art.

As an alternative to the parabolic curves of the embodiment of FIGS. 42 and 43, it will be evident to those skilled in the art that such curves may be elliptical, hyperbolic, empirical or other shapes to obtain the desired range requirements and sensitivity characteristics of the flowmeter.

Figure 44:
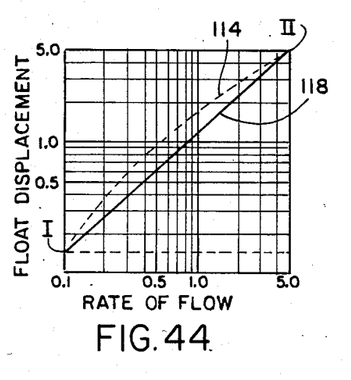
FIG. 44 is a graph showing readings from the flowmeter of FIGS. 42 and 43. The curve of the graph is exponential and is in comparison with the curve shown in FIG. 38.

FIG. 44 shows the curve 118 representing the operation of the flowmeter in FIGS. 42 and 43. Curve 118 is shown in comparison with the curve 114 of FIG. 38. Although no improvement of rangeability is provided over the embodiment represented by curve 114, the completely exponential curve 118 is particularly useful where potential error must always be a constant percentage of the rate of flow readout.

It will be evident that the embodiment shown in FIGS. 42 to 44 is suitable for low flow rates but as in the embodiments described hereinbefore, this embodiment may be modified for high flow rate applications.

Figure 45:
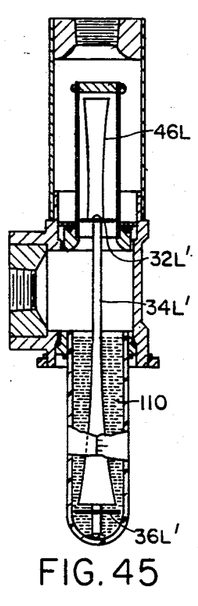
FIG. 45 is an elevational view partially in section of yet another embodiment of the present invention combining a connecting means of parabolic configuration with a recessed groove of inversed parabolic configuration. The indicator is in the position I at the low end of the range.
Figure 46:
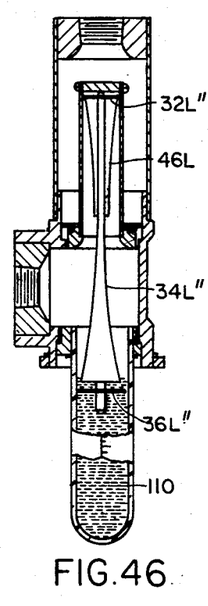
FIG. 46 is an elevational view partially in section of the embodiment shown in FIG. 45 but with the indicator in the position II at the upper end of the range.

FIG. 45 shows a modification of the embodiment of FIGS. 42 and 43. The recessed groove 46L is of inversed parabolic configuration. By suitable machining techniques, well known in the art, a flowmeter may be produced in which the shape of the connecting means 34L' and the recessed groove 46L are compatible to provide a curve which possesses perfect linearity.

Figures 47, 48, 49, 50, 51, 51A, 52, 52A, 53, 54:
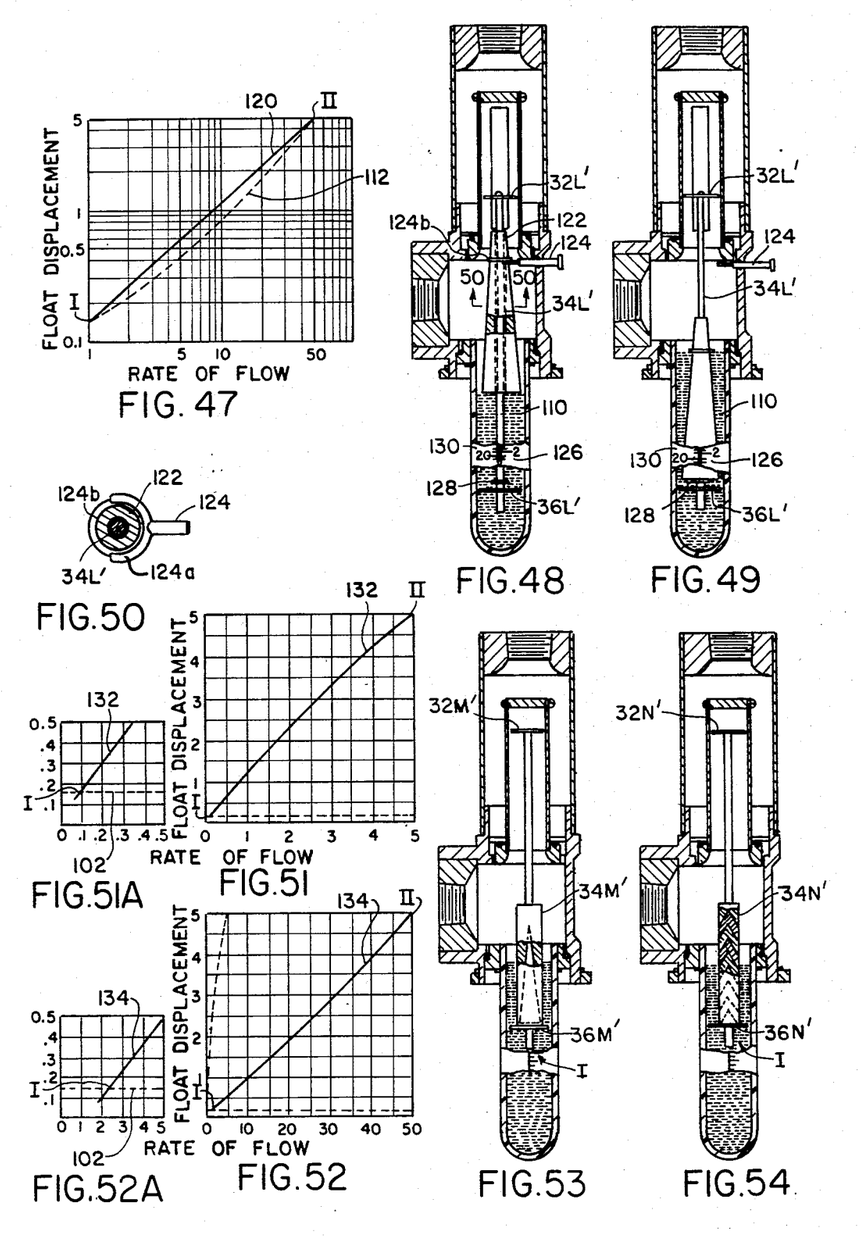

FIG. 47 shows the curve 120 in comparison with the curve 112 of FIG. 35.

A further embodiment of the flowmeter is shown in FIGS. 48 and 49. The embodiment of FIGS. 48 and 49 provides a single flowmeter which has the capability of being selectively used to read both a relatively low flow rate and a relatively high flow rate.

A conical weight 122 is slidably connected to the connecting means 34L' such that the connecting means may freely extend through a central aperture defined by the weight 122. A pin 124 is movable from a first location in which the pin 124 supports the weight 122. With the weight supported by the pin 124, the flowmeter may be used for measuring relatively low flow rates and a corresponding scale 126 cooperates with the indicator or second piston 36L'.

The pin 124 may be moved axially to a second location as shown in FIG. 49. With the pin 124 in the second location, the weight 122 drops relative to the connecting means 34L' until it rests upon a stop 128. With the weight 122 supported on the stop 128, the combined weight of the pistons and connecting means and the weight 122 is increased and the flowmeter is suitable for measuring relatively high gaseous flow rates. A second scale 130 is provided with a range suitable for measuring the higher flow rates.

FIG. 50 is a section taken on the line 50—50 of FIG. 48 and shows the pin 124 including a forked extension 124A which cooperates with a ring 124B secured to the conical weight 122.

FIG. 51 is a graph showing readings taken from the embodiment of FIG. 48. The weight 122 is supported by pin 124 such that the flowmeter operates with the low flow rate range. An enlargement is shown in FIG. 51A to shown curve 132 within the vicinity of position I.

FIG. 52 is a graph showing readings taken from the flowmeter of FIG. 48 but with the pin moved to the second location to allow the weight 122 to rest upon stop 128. The flowmeter is then used to measure high flow rates with the range 0–50.

FIG. 52A is an enlargement of the curve 134 in the vicinity of the position I of FIG. 52.

FIG. 53 shows a further embodiment of the flowmeter according to the present invention in which the connecting means 34M' is of uniform cross sectional area throughout the length thereof. However, the connecting means 34M' defines a conical cavity.

FIG. 54 shows another embodiment of the present invention in which the connecting means 34N' includes a plurality of cooperating caps of various densities. The caps cooperate to form a cylindrical connecting means 34N' having a density which varies throughout the length thereof. The caps may be of densities such that a flow rate curve of the required configuration may be obtained.

Although the present disclosure refers more particularly to improving rangeability and sensitivity of a flowmeter upon appropriate selection of effective combined weight, density of connecting means and density of static fluid, it will be evident to those skilled in the art that other factors will also have an effect upon the characteristics of the improved flowmeter. Such additional factors include the viscosity of the static fluid. In order to maintain a relatively consistent flowmeter reading, a static fluid having improved viscosity index is used. It is also clearly evident to those skilled in the art that the variation in the density of the connecting means may be accomplished by providing a connecting means of variable density throughout the length thereof or by providing a connecting means of varying density along the length thereof.

The improved flowmeter of the present invention provides means for measuring the gaseous flow rate over an extended range in comparison with the prior art devices. The improved flowmeter also provides increased sensitivity particularly in the low end of the range.

The foregoing has disclosed novel improvements of my prior patent and the prior art wherein the turndown ratio of flowmeters has been substantially increased and the resultant flowmeter construction has been greatly simplified. The reliability of the flowmeter has been increased and the manufacturing costs have been substantially decreased. It should be noted that all of the various variations of the instant invention may be interchanged for various applications which should be well known to those skilled in the art.

The present disclosure includes that contained in the appended claims as well as that of the foregoing description. Although this invention has been described in its preferred form with a certain degree of particularity, it is understood that the present disclosure of the preferred forms have been made only by way of example and that numerous changes in the details of construction and the combination and arrangement of parts may be resorted to without departing from the spirit and scope of the invention.

What is claimed is:

1. A flowmeter for measuring the flow rate of a fluid media comprising in combination:

a body portion including a fluid inlet and a fluid outlet;

a fluid path extending between said fluid inlet and said fluid outlet;

a core tube disposed vertically within said body portion;

a recessed groove defined by said core tube, said groove extending longitudinally relative to said core tube;

a first piston movably disposed within said core tube, said first piston being disposed adjacent to said recessed groove;

a cross-sectional area of said fluid path defined by said recessed groove and said first piston, said cross sectional area of said fluid path being variably dependent upon the longitudinal disposition of said first piston relative to said recessed groove;

a cover tube disposed adjacent said body portion and in fluid communication with said fluid path;

a second piston movably disposed within said cover tube;

connecting means for connecting said second piston to move in unison with said first piston;

a first and a second side of said second piston, said second piston being immersed in a static liquid in said cover tube enabling said static liquid to be disposed on said first and said second sides of said second piston; and an indicator means cooperating with said second piston for indicating the position thereof relative to said cover tube to indicate the fluid flow rate between said fluid inlet and said fluid outlet, said connecting means and said static liquid being related such that said indicator means is operative within a range dependent upon the buoyancy of said connecting means in said static liquid.

2. A flowmeter as set forth in claim 1 wherein said buoyancy is dependent upon the ratio of the density of said connecting means to the density of said static liquid.

3. A flowmeter as set forth in claim 2 wherein said buoyancy is further dependent upon the combined weight of said first and said second pistons and said connecting means.

4. A flowmeter as set forth in claim 2 wherein said range for measuring relatively low flow rates is dependent on a connecting means of relatively high density and a static liquid of relatively low density.

5. A flowmeter as set forth in claim 2 wherein said range for measuring relatively high flow rates is dependent upon a connecting means of relatively low density and a static liquid of relatively high density.

6. A flowmeter as set forth in claim 4 wherein said range for measuring relatively low flow rates is further dependent upon a relatively low combined weight of said first and said second pistons and said connecting means.

7. A flowmeter as set forth in claim 5 wherein said range for measuring relatively high flow rates is further dependent upon a relatively high combined weight of said first and said second pistons and said connecting means.

8. A flowmeter as set forth in claim 2 wherein said density of said connecting means increases along the length thereof.

9. A flowmeter as set forth in claim 3 wherein said combined weight of said first and said second pistons and said connecting means is effectively varied in accordance with varying flow rates dependent upon a corresponding immersed portion of said connecting means.

10. A flowmeter as set forth in claim 9 wherein said combined weight is further effectively varied in accordance with the variation of the cross sectional area of the connecting means thereof.

11. A flowmeter as set forth in claim 10 wherein said connecting means is conical in configuration.

12. A flowmeter as set forth in claim 10 wherein said connecting means is of a configuration enabling said range to be substantially linear.

13. A flowmeter as set forth in claim 12 wherein said connecting means is of curved configuration.

14. A flowmeter as set forth in claim 13 wherein said recessed groove is of inverse curved configuration relative to said curved configuration of said connecting means enabling increased sensitivity between the upper and the lower ends, respectively, of said range.

15. A flowmeter as set forth in claim 3 wherein said connecting means slidably extends through a further weight enabling said flowmeter to indicate a relatively low fluid flow rate, said further weight being connectible to said connecting means for movement therewith to indicate a relatively high fluid flow rate.

* * * * *